July 5, 1960
R. E. RAWLINS
2,944,256
RADAR AIMING ANGLE ANALYZER
Filed Aug. 11, 1955
3 Sheets-Sheet 1
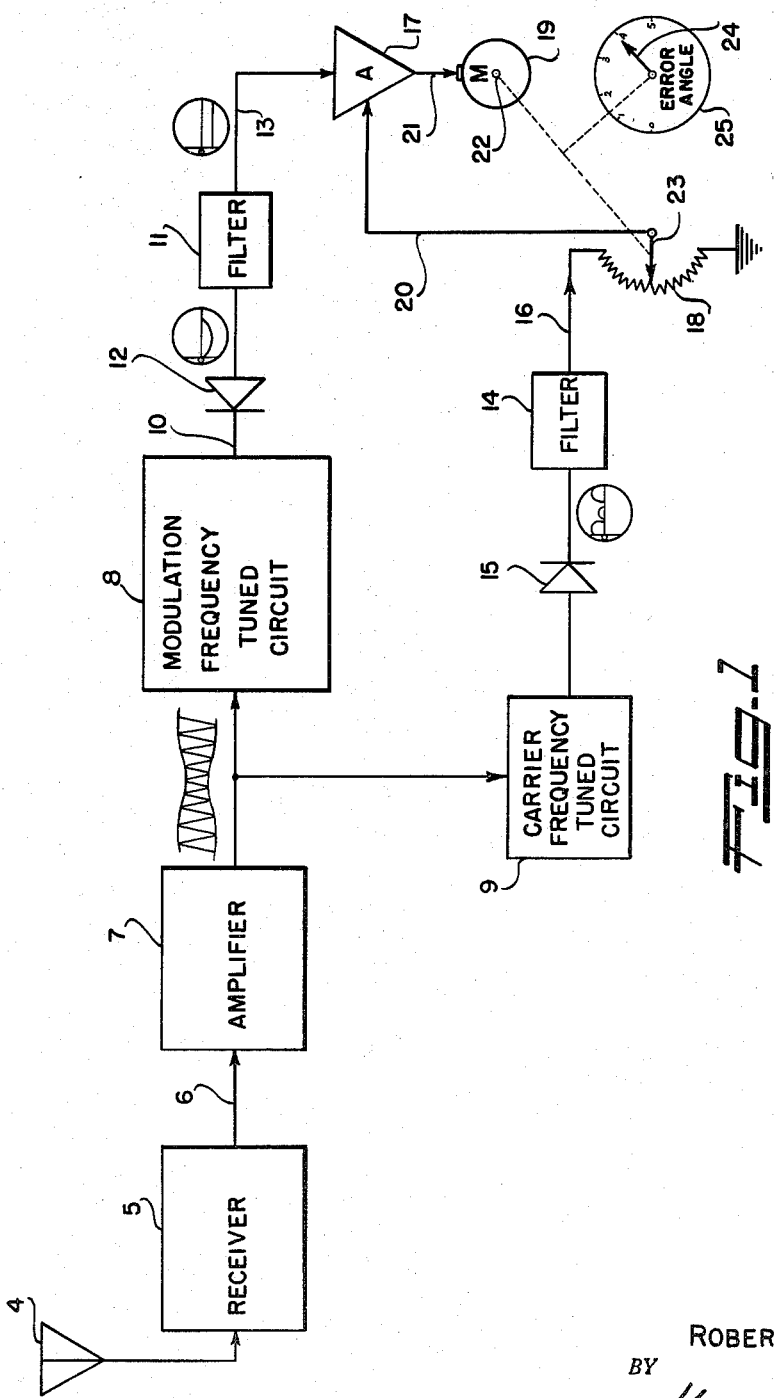
INVENTOR.
ROBERT E. RAWLINS
BY
*George Sullivan*
Agent

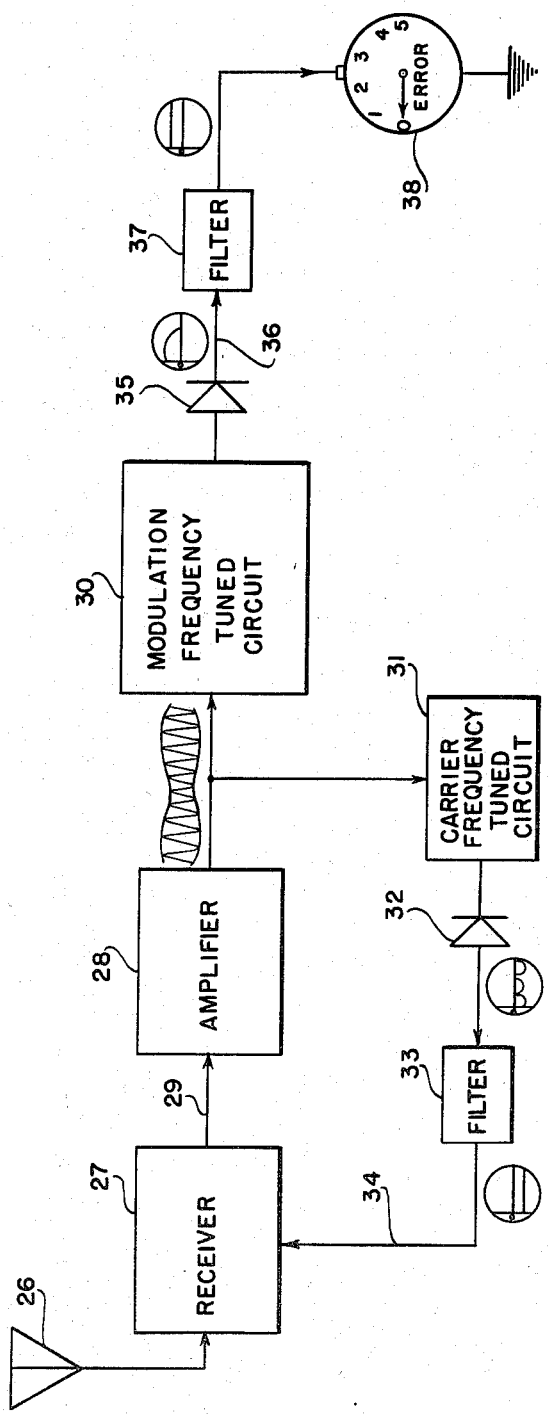

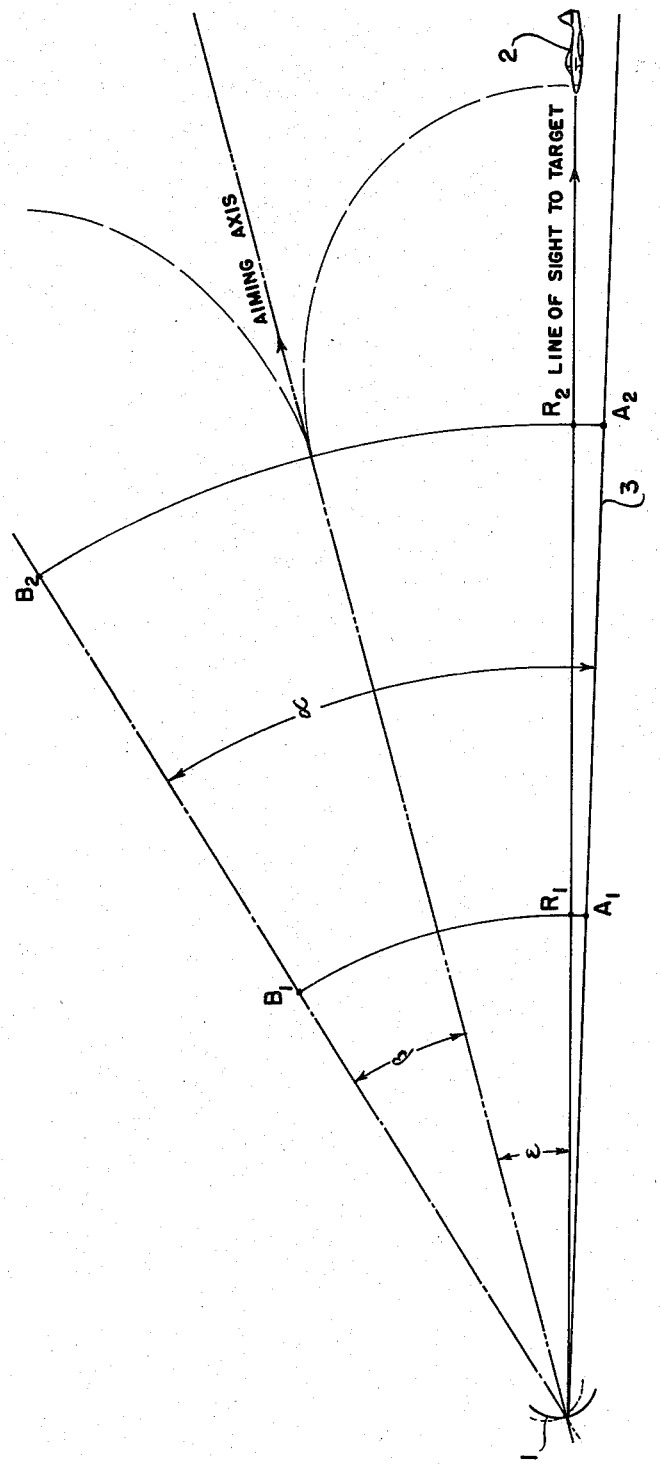

United States Patent Office 2,944,256
Patented July 5, 1960

2,944,256

RADAR AIMING ANGLE ANALYZER

Robert E. Rawlins, North Hollywood, Calif., assignor to Lockheed Aircraft Corporation, Burbank, Calif.

Filed Aug. 11, 1955, Ser. No. 527,704

9 Claims. (Cl. 343—113)

This invention relates, generally, to radar apparatus and the like which employs a directional energy beam to determine position information of a remote target and, more particularly, to an analyzer for detecting the presence of the energy beam and determining its aiming angle relative to the target.

It is an object of this invention to provide a radar aiming angle analyzer which functions independently of the average signal strength and, hence, independently of range to produce an output representing the aiming angle of a radar device by obtaining a ratio between the modulation amplitude and the carrier wave amplitude of the transmitted energy.

Another object of this invention is to provide a radar aiming angle analyzer which is comparatively simple in both operation and construction and which may be packaged within a small space, making it ideal for aircraft usage.

Another object of this invention is to provide a radar aiming angle analyzer which may be used in a number of applications such as in electronic countermeasure devices or in-flight radar boresighting equipment.

Further and other objects will become apparent from a reading of the following description, especially when considered in combination with the accompanying drawing wherein like numerals refer to like parts.

In the drawing:

Figure 1 is a block diagram showing one form of the radar aiming angle analyzer;

Figure 2 is a block diagram showing a second form of the radar aiming angle analyzer; and Figure 3 is a geometric diagram illustrating the theory of operation of the analyzer.

The principle employed in the invention is illustrated in Figure 3 wherein an antenna 1 at some remote location in space radiates electromagnetic energy at a selected radio frequency in a directional manner to provide a beam pattern having a width equal to $\alpha$ or twice the angle $\beta$. To cover a large search angle forwardly of the radiating antenna and to determine the relative position of a remote object or target 2, such as an aircraft, within the radiated energy beam, the beam is systemmatically moved, usually by tilting the antenna. Assuming the object detecting and locating antenna 1 employs a conical type scan, as would be the case in the Figure 3 arrangement, the aiming direction of the antenna is located centrally of the conical beam which is generated. An object, such as an aircraft 2, located within the radiated energy beam will receive and reflect energy but the average signal strength at the object will vary as a function of range. It is also of importance to note that the amplitude of the modulation envelope on the radio frequency carrier energy will vary both as a function of error angle and range. The change in amplitude of the modulation envelope due to the change in range is illustrated in Figure 3 wherein the arc $R_1$, $A_1$, at range $R_1$ is different from the arc $R_2$, $A_2$ at range $R_2$ even though the error angle $\epsilon$ of the object locating antenna 1 is the same. Since it is desired to measure the aiming error angle $\epsilon$ independently of range, it is necessary to extract the range function from the detected energy. From Figure 3 it is seen that the ratio between the arcs $R_1$, $A_1$ and $R_1$, $B_1$ is equal to the ratio between the arcs $R_2$, $A_2$ and $R_2$, $B_2$ which arcs represent the minimum and maximum distances of the radiated energy beam relative to object 2 at two different ranges as the energy beam is rotated in the case of the conical scan pattern, 180°. Since the ratios of the arcs are substantially constant for a given error angle and at all ranges, it is clear that the percentage of modulation as contrasted with the absolute amplitude of the modulation on the radio frequency carrier energy is solely a function of the aiming error angle $\epsilon$. Therefore, by detecting the radiated energy at some object, such as aircraft 2 in the radar search pattern and extracting the modulation envelope from the received energy and obtaining a ratio between the amplitude of the modulation and the amplitude of the carrier wave, an output representing the percentage of modulation which is proportional to the aiming error angle of the energy beam may be obtained. This is accomplished in the circuitry of Figures 1 and 2 to provide an arcuate indication of the aiming angle.

Referring to Figure 1, the aiming angle analyzer includes an antenna 4 which may be carried, for example by aircraft 2 in Figure 3, for applying the radio frequency energy transmitted by the remote antenna 1 to a receiver 5. Receiver 5 may be of any conventional type suitable for operation at the frequencies of the carrier wave being detected. The output 6 of receiver 5 is applied to an amplifier 7 for supplying power to a pair of band pass filters or tuned circuits 8 and 9 which separate the modulation signal from the carrier energy as picked up by receiver 5. Tuned circuits 8 and 9 may be of any conventional design so long as they are sufficiently selective to pass only the desired band of frequencies. Suitable circuits for these tuned circuit applications may be found in most any textbook on the subject of Radar Electronics, such as, War Department Technical Manual TM 11–466, entitled: "Radar Electronics Fundamentals" (pages 34 through 37 and 126 through 127). The output 10 of modulation frequency tuned circuit 8 is applied to a filter 11 through a rectifier 12 to produce a direct current voltage at the output 13 of filter 11 which has a negative polarity, the amplitude of which is proportional to the amplitude of the modulation appearing on the received carrier energy.

The output of carrier frequency tuned circuit 9 is applied to a filter 14 through a rectifier 15 to provide a direct current voltage at the output 16 of filter 14 which is of positive polarity and which has an amplitude proportional to the amplitude of the received carrier energy. Filters 11 and 14 may be conventional condenser-resistor smoothing circuits. Their only function is to improve the form of the signal supplied from the rectifiers.

The ratio between the amplitudes of the modulation on the carrier energy and the carrier energy itself for indicating the aiming angle of antenna 1 is obtained, as shown in Figure 1, by a servo system which includes a differential servo amplifier 17, a variable potentiometer 18 and a motor 19. Output 13 from filter 11 is applied directly to servo amplifier 17 while output 16 from filter 14 is applied to potentiometer 18. The output 20 of potentiometer 18 is fed back to servo amplifier 17 for comparison with the modulation voltage supplied by filter 11. A comparison between the voltages in the servo amplifier produces an output voltage which is applied to motor 19 through leads 21 for positioning motor shaft 22. Pickup 23 of potentiometer 18 is mechanically connected to shaft 22 for positioning to effectively obtain a ratio between the voltages appearing as the outputs from filters 11 and 14 wherein the ratio appears as a shaft rotation at motor 19.

Thus, to provide an indication of the error angle it is only necessary to mechanically drive the arm 24 of a suitable indicator 25 through a direct connection with shaft 22.

The circuitry of Figure 2 illustrates a means for indicating the aiming error angle without the use of a direct ratioing device such as is shown in Figure 1. Antenna 26 feeds the radiated energy into a receiver 27. The output of receiver 27 is applied to an amplifier 28 through lead 29 for supplying power to a pair of band pass filters or tuned circuits 30 and 31. Tuned circuit 31 is selected to pass only the carrier wave frequency in the same manner that tuned circuit 9 is employed in the circuit of Figure 1. The output of tuned circuit 31 is rectified by rectifier 32 and then fed into a direct current smoothing filter 33. The output of filter 33 is a direct current voltage, the amplitude of which is proportional to the amplitude of the radio frequency carrier applied to receiver 27. This voltage, which is of negative polarity after being rectified, is fed to receiver 27 as an automatic gain control feed back voltage through lead 34. The function of this feed back to receiver 27 is to stabilize and maintain substantially constant the average amplitude of the carrier wave energy. This, in effect, eliminates the range function in the modulation envelope appearing on the carrier wave energy as transmitted by the object locating antenna 1. Thus, the amplitude of the modulation envelope will vary only as a function of the error angle $e$.

Tuned circuit 30 in Figure 2 extracts the modulation envelope from the carrier wave energy and feeds the same through a rectifier 35 to provide pulsating direct current of positive polarity in lead 36. The pulsating direct current voltage in lead 36 is applied to a smoothing filter 37 for driving a galvanometer 38, or the like, calibrated to read the aiming angle directly. Where an electrical output is desired in lieu of a mechanical type output as shown in the circuit of Figure 1, the circuit of Figure 2 is perhaps the more desirable.

The invention as illustrated by the circuits of Figures 1 and 2 is useful in any application where it is desired to know the aiming angle of a radar device. An important application is its use in electronic countermeasures devices for indicating not only that you are being detected by a remote radar device such as might be carried in enemy aircraft but also to indicate the aiming angle of that remote radar device. By providing such information, it will be possible to anticipate an attack while there is still time to take evasive action.

The operation of the aiming error angle detectors or analyzers of Figures 1 and 2 is substantially identical in that both obtain a direct current voltage of one polarity which is proportional in amplitude to the modulation amplitude of the envelope on the radio frequency carrier energy detected by the receiver and a direct current voltage of opposite polarity having an amplitude which is proportional to the amplitude of the radio frequency carrier wave energy itself. In the Figure 1 circuitry these two direct current voltages are fed through a conventional servo system to provide a shaft output which is proportional to the ratio between the voltages for driving an indicator calibrated to read error angle directly.

The operation of the Figure 2 circuitry differs in this latter respect in that the direct current voltage representing the carrier wave amplitude is used for automatic gain control of receiver 27 for eliminating the range function in the modulation envelope which is extracted by the use of tuned circuit 30. Since the amplitude of the modulation envelope is thus made independent of range and proportional to the aiming error angle, a servo type ratioing device is unnecessary and the output of smoothing filter 37 may be used directly to drive a galvanometer for indicating the aiming angle.

The radar aiming angle analyzer described herein in connection with Figures 1 and 2 has many useful applications in connection with object detecting and locating devices and hence it is subject to many rather obvious alterations, modifications and substitutions for meeting the needs of a specific case. For one example, the alternating current output from the tuned circuits may be operated upon to provide the aiming angle information without first converting to direct current simply by using an A.C. type of ratio indicator. Also, the analyzer may be employed to advantage with any type of target seeking apparatus including infra red devices. Effective use of the analyzer depends only on a knowledge of the antenna pattern of the target seeker. Therefore, it should be understood that certain alterations, modifications and substitutions including any of those mentioned above may be made to the instant disclosure without departing from the spirit and scope of the invention as defined by the appended claims.

I claim:

1. A device for determining the aiming angle of conical scan radiant energy transmitting apparatus relative to said device comprising, a receiver for detecting the energy transmitted by the transmitting apparatus and reaching said device, a pair of tuned circuits connecting with said receiver, one of said pair of tuned circuits being responsive only to the transmitted radiant energy and producing an output signal proportional to the amplitude thereof, the other of said pair of tuned circuits being responsive only to the scan frequency modulation appearing on the radiant energy detected by said receiver and producing an output signal proportional to the amplitude thereof, means connecting with said tuned circuits and rectifying said output signals to provide voltages of opposite polarity, and means connecting with said last mentioned means and being responsive to a potential developed by the comparison of the rectified output signals for indicating the aiming angle of the transmitting apparatus relative to said device.

2. A device for determining the aiming angle of radiant energy transmitting apparatus relative to said device comprising, a receiver for detecting the radiant energy reaching said device which is transmitted by the transmitting apparatus, a pair of tuned circuits connecting with said receiver, one of said pair of tuned circuits being responsive only to the received radiant energy and producing an output signal proportional to the amplitude thereof, the other of said pair of tuned circuits being responsive only to the scan frequency modulation appearing on the radiant energy detected by said receiver and producing an output signal proportional to the amplitude thereof, means connecting with said tuned circuits and rectifying said output signals to provide voltages of opposite polarity, and ratioing means connecting with said last mentioned means and being responsive to the rectified output signals to provide an output representing the percentage of modulation of the radiant energy and hence the aiming angle of the transmitting apparatus relative to said device.

3. An analyzer for determining the aiming angle of a radiant energy transmitter comprising, a receiver detecting the radiant energy reaching said receiver which is transmitted by said transmitter, a pair of band pass filter circuits connecting with said receiver, one of said pair of filter circuits being responsive only to the received radiant energy and producing an output signal proportional to the amplitude thereof, the other of said pair of filter circuits being responsive only to the modulation envelope appearing on the radiant energy detected by said receiver and producing an output signal proportional to the amplitude thereof, means connecting with said filter circuits and rectifying said output signals to provide voltages of opposite polarity, and means responsive to the voltages of opposite polarity and indicating the aiming angle of the radiant energy transmitter relative to said receiver.

4. A wave form analyzer for determining the aiming angle of a radiant energy transmitter comprising, a receiver detecting the radiant energy at said receiver which is transmitted by the transmitter, filter means responsive to the receiver radiant energy and providing a pair of direct current voltages, one voltage being proportional to the average amplitude of the radiant energy and the other voltage being proportional to the average amplitude of the modulation envelope on the radiant energy, means responsive to the pair of direct current voltages for obtaining an output representing the ratio therebetween, and indicator means responsive to the last mentiond output providing a direct reading of the transmitter aiming angle relative to the receiver.

5. A wave form analyzer for determining the aiming angle of a radiant energy transmitter comprising, a receiver detecting the radiant energy reaching the receiver which is transmitted by the transmitter, filter means responsive to the received radiant energy and providing a pair of direct current voltages, one voltage being proportional to the average amplitude of the received radiant energy and the other voltage being proportional to the average amplitude of the modulation envelope on the received radiant energy, a potentiometer having said one voltage applied thereto, a differential amplifier having said other voltage applied thereto, a servo motor responsive to the output from said differential amplifier, said potentiometer having a pickup arm operatively connecting with said servo motor and electrically connecting with said differential amplifier whereby a ratio of said one voltage with respect to said other voltage is obtained as a shaft output from servo motor, and means operatively connecting with the output shaft of said servo motor indicating the relative aiming angle of said transmitter.

6. A wave form analyzer for determining the aiming angle of a radiant energy transmitter comprising, a receiver detecting the radiant energy reaching said receiver which is transmitted by the transmitter, filter means responsive to the received energy and providing a pair of direct current voltages, one voltage being proportional to the average amplitude of the received energy and the other voltage being proportional to the average amplitude of the modulation envelope on the received energy, automatic gain control means associated with said receiver and responsive to said one voltage for maintaining the average energy level at the receiver output substantially constant whereby said other voltage varies only as a function of the radiant energy aiming angle relative to the receiver, and indicator means responsive to said other voltage and providing a direct reading of the aiming angle of the transmitter.

7. A wave form analyzer for determining the aiming angle of a radiant energy transmitter comprising, means detecting the transmitted radiant energy, filter means responsive to the detected energy and providing a pair of signals, one signal being proportional to the amplitude of the detected radiant energy and the other signal being proportional to the amplitude of the modulation envelope on the detected radiant energy, and indicator means responsive to the pair of signals for obtaining the ratio therebetween and providing a direct reading of the aiming angle of the transmitter relative to the radiant energy detecting means.

8. An analyzer for determining the aiming angle of an energy transmitting device comprising, means detecting the transmitted energy at a remote location relative to said device, filter means responsive to the detected energy and providing a pair of signals, one signal being proportional to the amplitude of the detected energy and the other signal being proportional to the amplitude of the modulation envelope on the detected energy, means responsive to the pair of signals and providing an output representing the ratio therebetween, and indicator means responsive to the last mentioned output providing a direct reading of the aiming angle of the transmitting device relative to the energy detecting means.

9. An analyzer for determining the aiming angle of an energy transmitting device comprising, means detecting the radiated energy transmitted by said transmitting device, filter means responsive to the detected energy and providing an output representing the percentage of modulation of the detected energy, and means responsive to said output and indicating the aiming angle of the transmitting device relative to the detecting means.

References Cited in the file of this patent

UNITED STATES PATENTS

| | | |
|---|---|---|
| 2,179,928 | Hagenhaus | Nov. 14, 1939 |
| 2,264,063 | Bond | Nov. 24, 1941 |
| 2,554,188 | Guanella | May 22, 1951 |
| 2,578,241 | Guanella | Dec. 11, 1951 |
| 2,613,348 | Stodola | Oct. 7, 1952 |